124,122

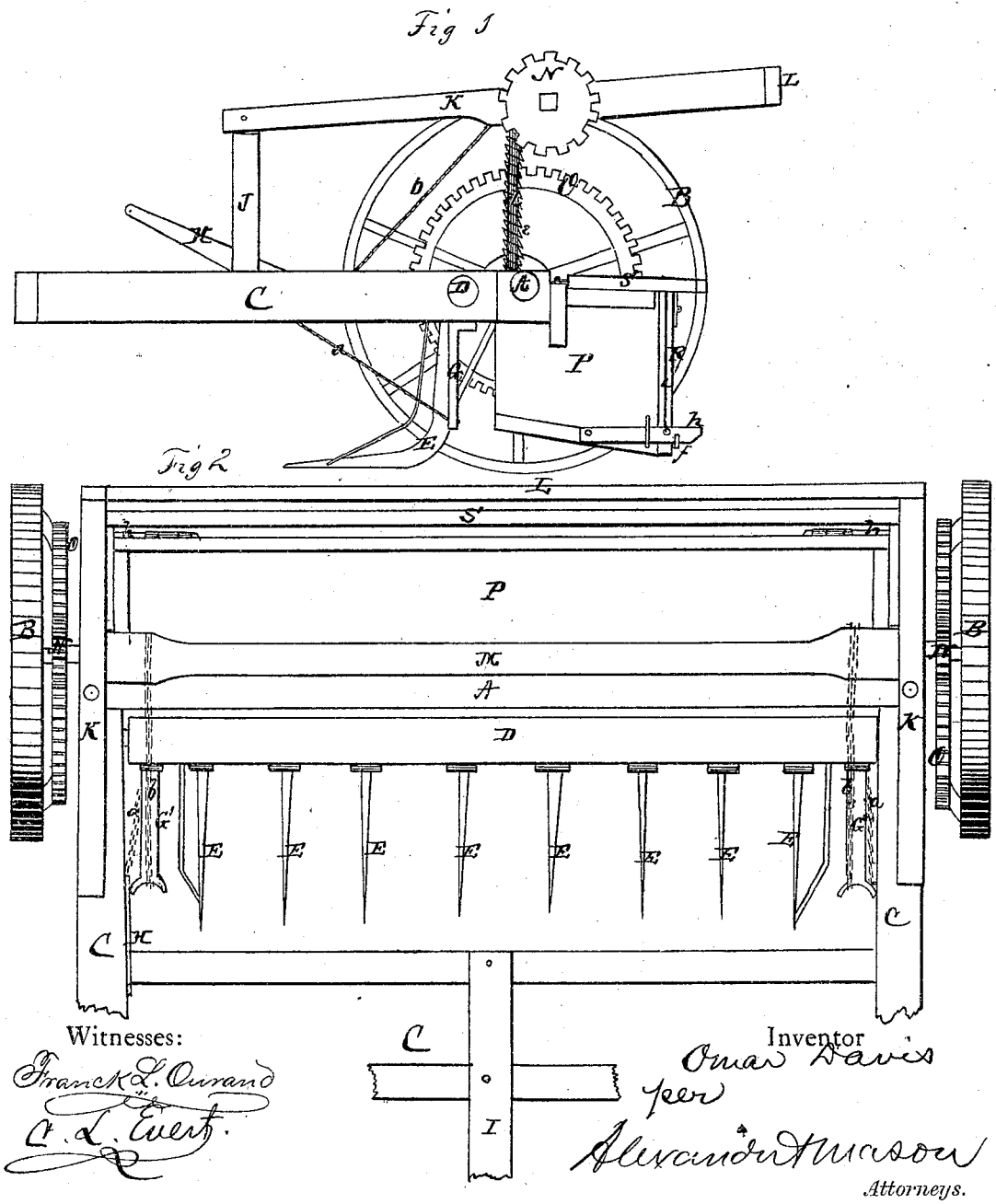

UNITED STATES PATENT OFFICE.

OMAR DAVIS, OF BATTLE CREEK, MICHIGAN.

IMPROVEMENT IN STONE-GATHERERS.

Specification forming part of Letters Patent No. 124,122, dated February 27, 1872.

*To all whom it may concern:*

Be it known that I, OMAR DAVIS, of the city of Battle Creek, in the county of Calhoun and in the State of Michigan, have invented certain new and useful Improvements in Machines for Gathering Stone; and do hereby declare that the following is a full, clear, and exact description thereof, reference being had to the accompanying drawing and to the letters of reference marked thereon making a part of this specification.

The nature of my invention consists in the construction and arrangement of a "stone-gatherer," as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a plan view of my stone-gatherer.

A represents the axle, having a wheel, B, at each end, and a frame, C, attached to its front side. In this frame, immediately in front of the axle A, is pivoted a shaft or head, D, to which is attached a series of L-shaped teeth, E E, said teeth following the surface of the ground after the manner of the horse-rake. The teeth are held in proper position and prevented from turning backward by means of chains $a\ a$, attached to the lower ends of two arms, G G, which are fastened one at each end of the head D. The other end of one of said chains is attached to the frame C, while that of the other chain is attached to the lower end of a lever, H, pivoted to the inner side of the frame C, and by means of said lever the operator is enabled at any time to raise the teeth from the surface of the ground sufficiently to clear any obstructions, &c., that may be encountered. The tongue I is attached in the center of the front portion of the frame C, as shown in Fig. 2. Upon the side pieces of the frame C are standards J J, on the upper ends of which are pivoted levers K K, extending toward the rear, and their rear ends connected by a bar, L, forming a handle for operating the teeth, so as to dump the load into a box at the rear. Between the levers K K, above the axle A, is pivoted a roller or shaft, M, from the ends of which, chains $b\ b$ pass downward to the ends of the arms G G, said chains passing over forked arms G' G', also attached to the head D and extending forward from the same at right angles with the arms G G. Upon the ends of the roller M, outside of the levers K K, are placed small cog-wheels, N N, which are made, when desired, to gear with cog-wheels O O, attached to the inner sides of the wheels B B. To the axle A are attached upright rods $d\ d$, which are surrounded by spiral springs $e\ e$, and their upper ends pass through holes in the levers K K, the springs $e\ e$ thus supporting said levers and holding the cog-wheels N N up from the cog-wheels O O. When the teeth have collected a sufficient amount of stone upon them the operator presses down upon the handle L, when the wheels N and O will gear together and turn the roller M, winding the chains $b\ b$ on the same. This raises the teeth E E until the stones fall off the same backward into the box P, when the operator lets go of the handle and the springs $e\ e$ throw the cog-wheels apart, allowing the teeth to fall down of their own weight into proper position again. The bottom of the box P is inclined downward toward the rear, as shown in Fig. 1, so that the stones deposited in it by the rake D E will have a tendency to fall toward the rear, against the rear side R of the box, which forms the door to the same, said door being hinged at its upper edge and provided near its lower edge with metal bars $f$ projecting toward the sides. These metal bars are caught by catches $h\ h$, pivoted to the ends of the box P, which thus hold the door R closed. The catches $h\ h$ are by rods or wires $i$ connected with a frame, S, pivoted to the ends of the box near the front edge, so that by raising said frame the catches $h\ h$ will be raised from the bars $f f$ and the stones will open the door R and be deposited on the ground in regular windrows in the same manner as a horse-rake deposits hay.

Having thus fully described my invention, what I claim as new, and desire to secure by Letters Patent, is—

1. The combination of the head D, L-shaped teeth E E, arms G G, and chains $a\ a$, all constructed as described and arranged within the frame C, substantially as and for the purposes herein set forth.

2. The combination, with the frame C, of the rake D E, arms G G G' G', chains $b\ b$, roller M, pivoted frame K L, cogs N N O O, rods $d\ d$, and springs $e\ e$, all constructed, arranged, and operating substantially as set forth.

In testimony that I claim the foregoing I have hereunto set my hand this 12th day of December, 1871.

OMAR DAVIS.

Witnesses:
MARTIN METCALF,
J. H. MALLORY.